June 12, 1945.  R. A. RUTH  2,378,249
TRIMMER
Filed July 7, 1944
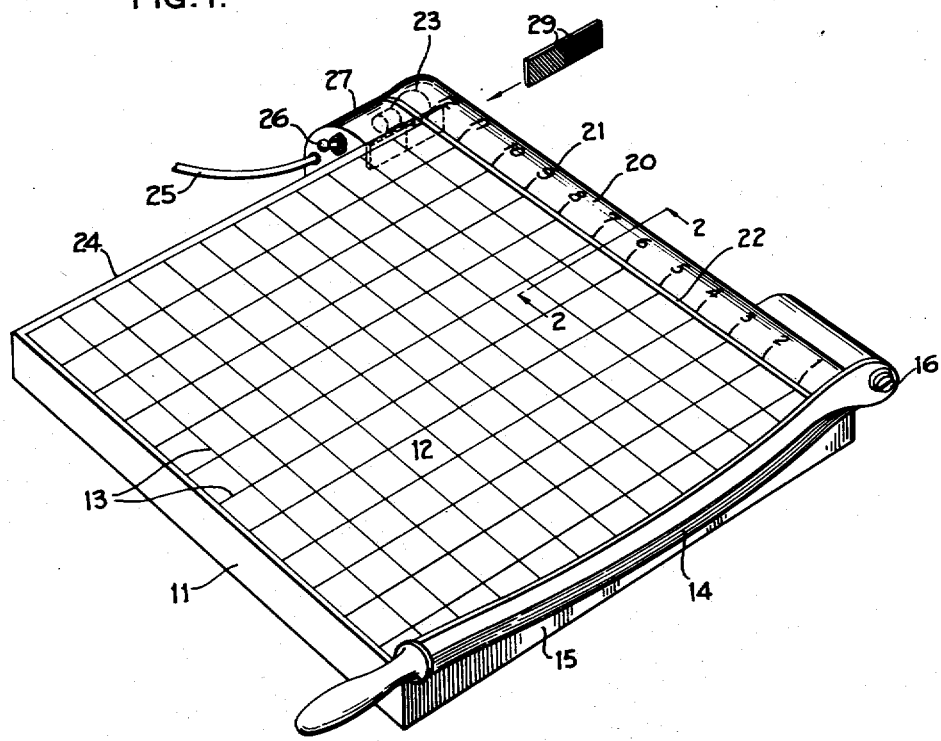
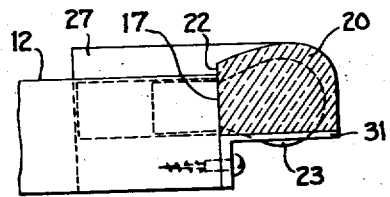
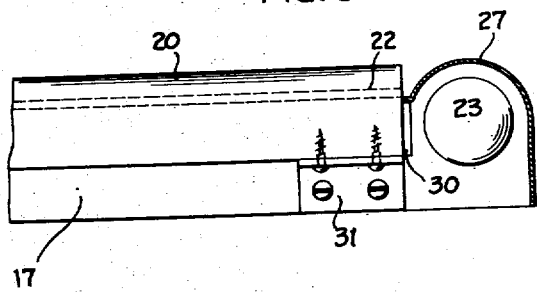
ROGER A. RUTH
INVENTOR Patented June 12, 1945

2,378,249

UNITED STATES PATENT OFFICE 2,378,249

TRIMMER

Roger A. Ruth, Rochester, N. Y., assignor to Eastman Kodak Company, Rochester, N. Y., a corporation of New Jersey Application July 7, 1944, Serial No. 543,834

7 Claims. (Cl. 164—44)

The present invention relates to trimmers, and more particularly to trimmers for use in connection with photographic materials such as sensitized paper or film.

These materials are usually trimmed to the desired size by placing the material on the trimmer with one edge of the material positioned against a scale which serves both as a guide and as a means for measuring the size of the material being trimmed. It is often necessary, however, to trim such materials in a darkroom, either in total darkness or in a portion of the darkroom which is dimly or inadequately lighted. As will be readily apparent to those having even the most meager experience in darkrooms, the usual trimmers provided with a wood or Celluloid scale are entirely unsuited for such use. However, in order to permit such trimming to be done under such restricted light conditions, the present invention provides a trimmer having a scale or ruler which is illuminated with a suitable non-actinic light so that the scale may be readily visible even in total darkness. The illumination of the scale is, however, such as not to affect the sensitized material being worked on.

The present invention has, therefore, as its principal object, the provision of a scale member of light transmitting material which is lighted by a non-actinic light source which illuminates the scale for its full length so as to be readily visible in a darkroom.

Still another object of the invention is the provision of a filter member adapted to be used in connection with a light source so that the light which illuminates the scale member is of the type required for the particular material being handled.

And a further object of the invention is the provision of an illuminated scale, which is simple in construction, inexpensive, rugged, and highly effective in use.

To these and other ends, the invention resides in certain improvements and combinations of parts, all as will be hereinafter more fully described, the novel features being pointed out in the claims at the end of the specification.

In the drawing:

Fig. 1 is a perspective view of a trimmer showing the relation thereto of a scale and illuminating means constructed in accordance with the preferred embodiment of the invention;

Fig. 2 is a partial sectional view through the trimmer and taken substantially in line 2—2 of Fig. 1, showing the relation of the scale and the lighting means therefore; and Fig. 3 is a rear view of a portion of the trimmer illustrated in Fig. 1 showing the relation of the filter receiving slot to the scale and light source.

The trimmer of the present invention comprises a body portion 11 formed of wood or other similar material on which the material to be trimmed may be placed in the usual and well-known manner. The upper surface 12 of the portion 11 is provided with a series of lines 13 arranged at right angles for properly aligning the edges of the material during the trimming operation. A knife 14 is arranged along one side 15 of the portion 11 and is connected to the latter by means of a pintle 16 secured to the upper or rear edge 17. The trimmer so far described is of a standard and well-known construction and does not constitute a part of the present invention.

A scale member 20 of suitable length and of the shape best shown in Fig. 2 is arranged along the edge 17 and is secured thereto by means of brackets 31. The scale is formed of any suitable transparent or translucent light-transmitting material, such as "lucite" which is etched, printed, or otherwise formed to provide numerals 21, spaced in accordance with the lines 12. These numerals may be spaced to represent inches or any other suitable dimension. An edge 22 is provided against which the material to be trimmed may abut, in the usual well-known manner.

In order that the scale member 20 may be used in a darkroom for trimming photographic paper or film, it is necessary that the member be suitably lighted or illuminated so that the numerals 21 will be readily visible. In the preferred arrangement, the scale member 20 is edge lighted by means of a light source 23 positioned on the edge 24 of the body portion 11 and in alignment with the scale member 20, as illustrated in the drawing. The light source is connected by a suitable cord 25, to a source of electric current not shown, and a switch 26 may be provided for turning the light on and off. The light 23 is preferably positioned in a housing 27 secured to the end 24 of the body portion and the switch 26 may be mounted on this housing.

It will now be apparent that the light source 23 will supply light to the left end of the scale member 20. This light will be transmitted along the member to illuminate the scale to make the various numerals 21 readily visible thereon. The light supplied to the scale member should be of sufficient intensity to illuminate the scale for the full length thereof so that the numerals will be readily visible, yet should be of a spectral quality such as not to affect the sensitized material being used. For this reason, non-actinic light is supplied to the scale member.

Such non-actinic light may be secured by means of a light source 23 itself, in which case the lamp must be a color suitable for the particular material being trimmed. In the preferred arrangement, however, an ordinary white light source 23 is provided. This light is then altered before it is supplied to the end of the scale member 20. This alteration may be secured by means of a suitably colored filter 29 which may be inserted in a slot 30 formed in the lamphouse 27 and positioned between the light source 23 and the left end of the scale member 20, as will be readily apparent from an inspection of Fig. 3. By properly selecting the filter 29 any desired spectral quality of non-actinic, white, or other colored light, may be supplied to the scale member 20 to illuminate the latter so that the numeral 21 may be visible. The particular filter used should be such that the light illuminating the scale member will be safe for the particular type of sensitized material being handled. For convenience, the filter 29 may be formed of two members of different colors so that by merely reversing the filter two different non-actinic lights may be secured. Various other filters may be provided, and by inserting the proper filter in the slot 30, the scale 20 may be readily illuminated without effecting the sensitized material being trimmed.

By means of the above-described arrangement, the scale member may be suitably illuminated so as to be readily visible in a darkroom or in a dimly lighted section thereof and the particular color of the illuminating light may be selected to suit the material being operated upon, the advantages of which are readily apparent.

While one embodiment of the invention has been disclosed, it is to be understood that the inventive idea may be carried out in a number of ways. This application is, therefore, not to be limited to the precise details described but is intended to cover all variations and modifications thereof falling within the scope of the appended claims.

I claim:

1. In a trimmer, the combination with a body portion, trimming means arranged along one edge of said portion, of a scale member formed of light transmitting material positioned along another edge of said portion, and means for applying non-actinic light to illuminate said member.

2. In a trimmer, the combination with a body portion, trimming means arranged along one edge of said portion, of an elongated scale member formed of light transmitting material positioned along another edge of said portion, and means adapted to apply non-actinic light to said member for transmission therealong to illuminate said scale member.

3. In a trimmer, the combination with a body portion, trimming means arranged along one edge of said portion, of a flat elongated scale member formed of transparent material and positioned at one end of said portion, and means for applying light at an end of said member for transmission therealong to illuminate said scale for the full length thereof.

4. In a trimmer, the combination with a body portion, trimming means arranged along one edge of said portion, of a scale member formed of light transmitting material positioned along another edge of said portion, and means for applying a non-actinic light to one end of said member for transmission therealong to illuminate said scale.

5. In a trimmer, the combination with a body portion, trimming means arranged along one edge of said portion, of a flat elongated scale member formed of transparent material and positioned along another edge of said portion, and a non-actinic light source positioned at one end of said member for supplying non-actinic light to said member for transmission along said member to illuminate the latter.

6. In a trimmer, the combination with a body portion, trimming means arranged along one edge of said portion, of a scale member formed of light transmitting material positioned along another edge of said portion, a light source positioned at one end of said scale member, and a filter positioned between said source and the end of said member to supply non-actinic light thereto which is transmitted therealong to illuminate said member.

7. In a trimmer, the combination with a body portion, trimming means arranged along one edge of said portion, of a scale member formed of light transmitting material arranged along another edge of said portion, a light source mounted on said portion and positioned to supply light to one end of said scale member, a housing for said light source, said housing being formed with a slot positioned intermediate said light source and said one end, and a filter removably positioned in said slot to supply non-actinic light to said scale member to illuminate the latter for the full length thereof.

ROGER A. RUTH.

DISCLAIMER 2,378,249.—*Roger A. Ruth*, Rochester, N. Y. TRIMMER. Patent dated June 12, 1945. Disclaimer filed June 11, 1947, by the assignee, *Eastman Kodak Company;* the inventor, assenting.

Hereby enters this disclaimer to claims 1, 2, 4, and 5 of said patent.

[*Official Gazette July 15, 1947.*]

used. For this reason, non-actinic light is supplied to the scale member.

Such non-actinic light may be secured by means of a light source 23 itself, in which case the lamp must be a color suitable for the particular material being trimmed. In the preferred arrangement, however, an ordinary white light source 23 is provided. This light is then altered before it is supplied to the end of the scale member 20. This alteration may be secured by means of a suitably colored filter 29 which may be inserted in a slot 30 formed in the lamphouse 27 and positioned between the light source 23 and the left end of the scale member 20, as will be readily apparent from an inspection of Fig. 3. By properly selecting the filter 29 any desired spectral quality of non-actinic, white, or other colored light, may be supplied to the scale member 20 to illuminate the latter so that the numeral 21 may be visible. The particular filter used should be such that the light illuminating the scale member will be safe for the particular type of sensitized material being handled. For convenience, the filter 29 may be formed of two members of different colors so that by merely reversing the filter two different non-actinic lights may be secured. Various other filters may be provided, and by inserting the proper filter in the slot 30, the scale 20 may be readily illuminated without effecting the sensitized material being trimmed.

By means of the above-described arrangement, the scale member may be suitably illuminated so as to be readily visible in a darkroom or in a dimly lighted section thereof and the particular color of the illuminating light may be selected to suit the material being operated upon, the advantages of which are readily apparent.

While one embodiment of the invention has been disclosed, it is to be understood that the inventive idea may be carried out in a number of ways. This application is, therefore, not to be limited to the precise details described but is intended to cover all variations and modifications thereof falling within the scope of the appended claims.

I claim:

1. In a trimmer, the combination with a body portion, trimming means arranged along one edge of said portion, of a scale member formed of light transmitting material positioned along another edge of said portion, and means for applying non-actinic light to illuminate said member.

2. In a trimmer, the combination with a body portion, trimming means arranged along one edge of said portion, of an elongated scale member formed of light transmitting material positioned along another edge of said portion, and means adapted to apply non-actinic light to said member for transmission therealong to illuminate said scale member.

3. In a trimmer, the combination with a body portion, trimming means arranged along one edge of said portion, of a flat elongated scale member formed of transparent material and positioned at one end of said portion, and means for applying light at an end of said member for transmission therealong to illuminate said scale for the full length thereof.

4. In a trimmer, the combination with a body portion, trimming means arranged along one edge of said portion, of a scale member formed of light transmitting material positioned along another edge of said portion, and means for applying a non-actinic light to one end of said member for transmission therealong to illuminate said scale.

5. In a trimmer, the combination with a body portion, trimming means arranged along one edge of said portion, of a flat elongated scale member formed of transparent material and positioned along another edge of said portion, and a non-actinic light source positioned at one end of said member for supplying non-actinic light to said member for transmission along said member to illuminate the latter.

6. In a trimmer, the combination with a body portion, trimming means arranged along one edge of said portion, of a scale member formed of light transmitting material positioned along another edge of said portion, a light source positioned at one end of said scale member, and a filter positioned between said source and the end of said member to supply non-actinic light thereto which is transmitted therealong to illuminate said member.

7. In a trimmer, the combination with a body portion, trimming means arranged along one edge of said portion, of a scale member formed of light transmitting material arranged along another edge of said portion, a light source mounted on said portion and positioned to supply light to one end of said scale member, a housing for said light source, said housing being formed with a slot positioned intermediate said light source and said one end, and a filter removably positioned in said slot to supply non-actinic light to said scale member to illuminate the latter for the full length thereof.

ROGER A. RUTH.

DISCLAIMER 2,378,249.—*Roger A. Ruth*, Rochester, N. Y. TRIMMER. Patent dated June 12, 1945. Disclaimer filed June 11, 1947, by the assignee, *Eastman Kodak Company;* the inventor, assenting.

Hereby enters this disclaimer to claims 1, 2, 4, and 5 of said patent.

[*Official Gazette July 15, 1947.*]